(12) United States Patent
Polzin et al.

(10) Patent No.: US 6,305,486 B1
(45) Date of Patent: Oct. 23, 2001

(54) HYDROSTATIC DRIVE AND STEERING SYSTEM FOR A UTILITY VEHICLE

(75) Inventors: Keith M. Polzin, Tea, SD (US); Gene A. Van Voorst, Inwood, IA (US)

(73) Assignee: Koyker Manufacturing Company, Lennox, SD (US)

( * ) Notice: Subject to any disclaimer, the term of this patent is extended or adjusted under 35 U.S.C. 154(b) by 0 days.

(21) Appl. No.: 09/495,127

(22) Filed: Feb. 1, 2000

Related U.S. Application Data

(60) Provisional application No. 60/118,588, filed on Feb. 4, 1999.

(51) Int. Cl.$^7$ .................................................. B60K 17/356
(52) U.S. Cl. ........................................... 180/308; 180/242
(58) Field of Search ................................... 180/305, 307, 180/308, 242

(56) References Cited

U.S. PATENT DOCUMENTS

| | | |
|---|---|---|
| 3,882,679 | 5/1975 | Williamson . |
| 3,952,511 | 4/1976 | Turner et al. . |
| 4,665,699 | 5/1987 | Krusche . |
| 4,716,730 | 1/1988 | Hagin et al. . |
| 5,070,695 | 12/1991 | Metzner . |
| 5,167,291 | 12/1992 | Mann . |
| 5,576,962 | 11/1996 | Ferguson et al. . |
| 5,607,027 * | 3/1997 | Puett, Jr. .............................. 180/308 |
| 5,848,664 * | 12/1998 | Kaspar ................................. 180/308 |
| 5,931,078 | 8/1999 | Kropp . |
| 5,975,224 | 11/1999 | Satzler . |
| 6,119,802 * | 9/2000 | Puett, Jr. .............................. 180/308 |

* cited by examiner

*Primary Examiner*—Kevin Hurley
(74) *Attorney, Agent, or Firm*—McAndrews, Held & Malloy, Ltd.

(57) ABSTRACT

A hydrostatic drive for a utility vehicle includes a prime mover (engine) which drives a variable rate hydrostatic pump. In a two-wheel drive system, the hydraulic fluid flow from the pump is split evenly and directed to the rear wheel motors. This flow turns the rear wheel motors and then exits the wheel motors where it is directed back to the pump. In a four-wheel drive system the flow from the pump is split evenly between the front wheel motors. The flow exiting the front motors is directed to the rear wheel motors on the opposite sides of the vehicles. This flow turns the rear motors and then is directed back to the pump. Direction and speed of the vehicle is regulated by an operator-controlled actuator which controls the direction and displacement of the hydrostatic pump. A neutral valve is interconnected between the pump and the motors. The neutral valve is movable between a first position at which fluid flow output from the pump bypasses the motors and is redirected to the pump, and a second position at which the output flow from the pump is directed to the hydraulic motors. The neutral valve allows the pump to be disengaged from the motors so the vehicle can be easily pushed by hand. The hydrostatic drive also includes a flow control valve interconnected between the pump and the motors and being adapted to bypass fluid flow around the motors until the rate of flow from the pump reaches a predetermined level. The flow control valve operates to expand the neutral region and add to the controllability of the vehicle. The vehicle also has a hydrostatic steering system.

10 Claims, 5 Drawing Sheets

HYDROSTATIC DRIVE AND STEERING SYSTEM FOR A UTILITY VEHICLE

CROSS-REFERENCE TO RELATED APPLICATIONS

This Application claims priority of Provisional Application Ser. No. 60/118,588, filed on Feb. 04, 1999.

STATEMENT REGARDING FEDERALLY SPONSORED RESEARCH OR DEVELOPMENT

Not Applicable.

BACKGROUND OF THE INVENTION

Utility vehicles are commonly used on farms, ranches and construction sites for sportsman's applications transporting cargo over a variety of terrain. Prior utility vehicles have employed mechanical drive systems in which the output of the engine drives the wheels through a mechanical linkage such as a chain, belt or drive shaft. As a result these vehicles have been costly and complicated to manufacture and maintain. It is particularly high maintenance to provide four-wheel drive in these vehicles when a mechanical drive is employed. Hence, it is desirable to provide hydrostatic drive that can be used in these small utility vehicles. It is also desirable to provide such a vehicle with a hydrostatic (power) steering system.

BRIEF SUMMARY OF THE INVENTION

One object of the present invention is to provide a hydrostatic drive system for a utility vehicle.

Another object of the present invention is to provide a two-wheel hydrostatic drive system for a utility vehicle.

Yet another object of the present invention is to provide a four-wheel hydrostatic drive system for a utility vehicle.

A further object of the present invention is to provide a hydrostatic steering system for a utility vehicle.

Still another object of the present invention is to provide a hydrostatic drive system that is simple and economical to manufacture and maintain.

These and other objects are provided by a hydrostatic drive for a utility vehicle which includes a variable rate hydrostatic pump driven by a prime mover. In a two-wheel drive system, hydraulic fluid from the pump is split evenly between the rear motors. The flow turns the motors, exits the motors and is then directed back to the pump. In a four-wheel drive system, the hydraulic fluid flow from the pump is split evenly and directed to the front wheel motors. This flow turns the front wheel motors and then exits the wheel motors. The flow exiting the front motors is directed to the rear wheel motors on the opposite sides of the vehicle. The flow exiting the rear motors is then directed back to the pump. The hydrostatic drive does include a neutral valve interconnected between the pump and the motors. The neutral valve is movable between a first position at which fluid flow output from the pump bypasses the motors and is redirected to the pump, and a second position at which the output flow from the pump is directed to the hydraulic motors. The hydrostatic drive does include a flow control valve interconnected between the pump and the motors and being adapted to bypass fluid flow around the motors until the rate of flow from the pump reaches a predetermined level.

DETAILED DESCRIPTION OF THE INVENTION

Figure 1:
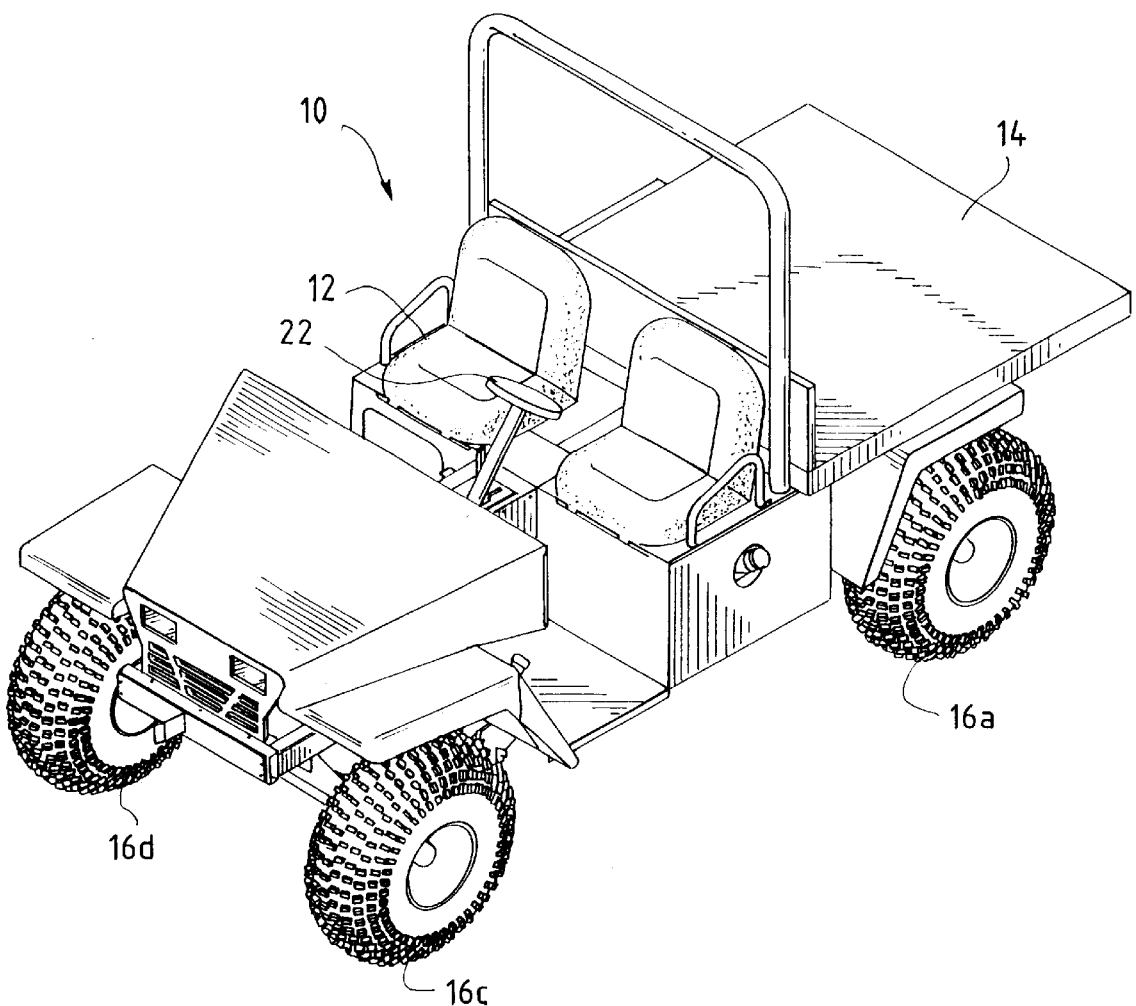
FIG. 1 is a front perspective utility vehicle having a hydrostatic drive and steering system according to the present invention.
Figure 2:
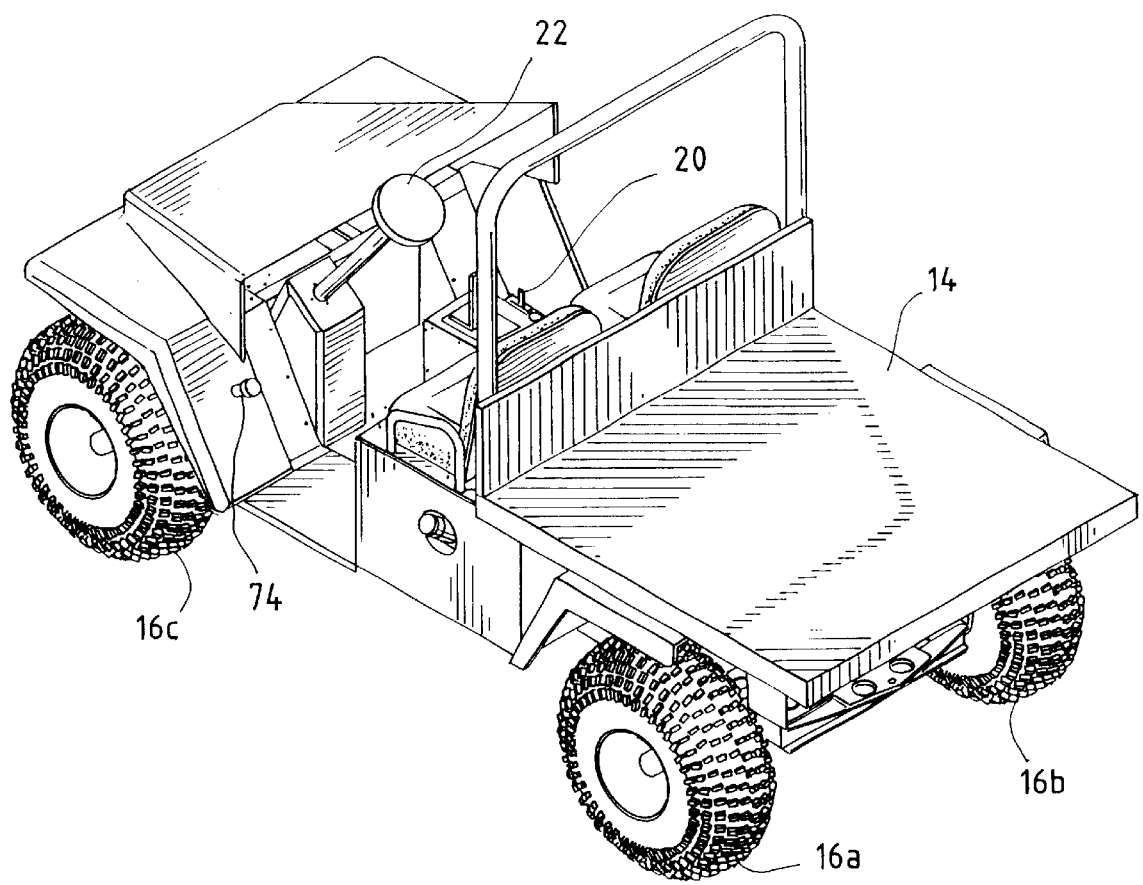
FIG. 2 is a rear perspective view of the utility vehicle of FIG. 1.
Figure 3:
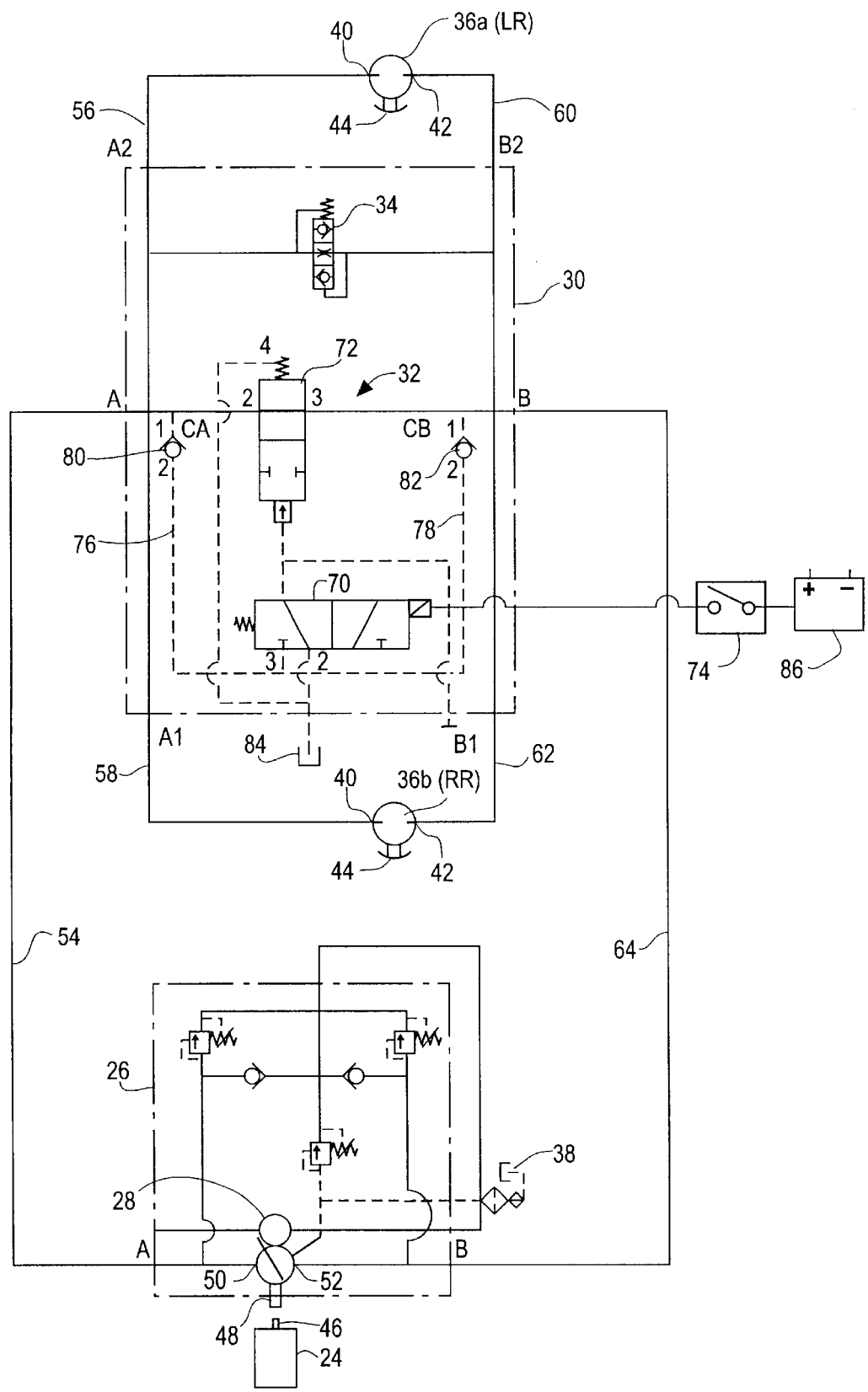
FIG. 3 is a schematic illustration of a two-wheel drive embodiment of hydrostatic drive according to the present invention.

While the invention will be described in connection with one or more embodiments, it will be understood that the invention is not limited to those embodiments. On the contrary, the invention includes all alternatives, modifications, and equivalents as may be included within the spirit and scope of the appended claims. Referring now to FIGS. 1–3 a two-wheel drive hydrostatic drive for a utility vehicle 10 will be described. Briefly, the utility vehicle 10 generally includes a passenger area 12, a cargo area 14, and four wheels 16a–d. A steering wheel is provided for steering the front wheels in a manner described below. The vehicle also includes an engine speed control lever 18 and a lever or foot pedal 20 for controlling the speed and direction (forward/reverse) of the vehicle. A steering wheel 22 is provided for steering the front wheels 16a, 16c via a hydrostatic steering system as described below.

Referring to FIG. 3, the hydrostatic drive includes a prime mover (engine 24), a hydrostat 26 (which is a variable displacement pump 28), a control block 30 (including a neutral valve 32 and a flow control valve 34), AND a pair of fixed displacement hydraulic motors 36a, 36b. The hydraulic components are connected in a closed-loop hydraulic circuit, and the hydrostatic pump 28 is connected to a fluid reservoir 38. The pump injects a small amount of fluid from the reservoir into the closed circuit to compensate for fluid losses and cooling in the closed circuit. The engine 24 may be a 20 hp v-twin motor as is available from the Kohler Company of Kohler, Wis. The hydrostat 26 may be an M35 axial piston variable displacement pump as is available from Sauer-Sunstrand. This pump 28 has a maximum output of 35 gallons per minute. The hydraulic motors 36a, 36b may be series TF motors from the Parker Hannifin Corporation in Greeneville, Tenn.

The hydraulic motors 36a, 36b each have a first or forward port 40, a second or reverse port 42, and an output shaft 44 connected to a respective one of the rear wheels 16a, 16b for imparting rotation thereon in response to fluid flow through the motor. (It should be noted that the vehicle could also be front wheel drive without departing from the scope of the present invention).

The output shaft 46 of the engine 24 is connected to the shaft 48 of the pump 28 for driving the pump. The pump 28 has a first or forward port 50 and a second or reverse port 52. The forward port 50 of the pump interconnected (through the control block) with the forward ports 40 of the motors 36 for permitting fluid flow therebetween. Similarly, the reverse port 52 of the pump 28 is interconnected (through the control block) with the reverse ports 42 of the motors 36 for permitting fluid flow therebetween.

The speed/direction control lever 20 is connected to the variable displacement pump 28 for controlling the direction and displacement of the pump, thereby controlling the direction and rate of fluid flow from the pump. The speed/ direction lever or foot pedal 20 is movable between a range of forward positions, a neutral position, and a range of reverse positions. When the pump 28 is displaced to a forward position, fluid flows from the forward port 50 at a rate controlled by the displacement of the pump and the speed of the engine 24. Preferably the engine 24 is operated a fixed speed (3500 rpm), so that vehicle speed is controlled solely by the position of the speed/direction lever 20. The fluid flows from the pump 28 to the control block 30 via a fluid line (hose) 54 where it is split evenly and directed to the forward ports 40 of the wheel motors 36 via fluid lines 56, 58. This flow turns the wheel motors 36a, 36b and then exits the reverse ports 42 of the wheel motors where it is directed back to the reverse port 52 of the pump through the control block 30. For this purpose, fluid lines 61, 62 extend between the reverse ports 42 of the motors and the control block 30. The flow from the lines 60, 62 merges in the control block 30 and is routed to the reverse port 52 of the pump 28 via the fluid conduit 64. Conversely, when the pump 28 is displaced to a reverse position, fluid flows from the reverse port 52 of the pump 28 to the control block 30 via line 64. The flow is split evenly in the control block 30 and directed to the reverse ports 42 of the rear wheel motors 36a, 36b via lines 60, 62. This flow turns the rear wheel motors 36a, 36b and then exits the forward ports 40 of the wheel motors 36a, 36b where it is directed back to the forward port of the pump through the lines 56, 58, control block 30, and line 54.

The control block 30 includes a flow control valve 34 interconnected between the pump 28 and the motors 36. The control valve 34 is adapted to bypass fluid flow around the motors 36a, 36b until the rate of flow from the pump 28 reaches a predetermined level. In the preferred embodiment, the motors are bypassed until the flow rate reaches 1 gallon per minute. Once the flow reaches one gallon per minute, the valve 34 is biased to its closed position causing the fluid to flow through the rear wheel motors 36a, 36b. The flow control valve 34 adds to the controllability of the vehicle by expanding the neutral region of the hydrostatic drive.

The control block 30 also includes a neutral valve 32 which is interconnected between the pump 28 and the motors 36. The neutral valve 32 is movable between a first (open) position at which fluid flow output from the pump 28 bypasses the motors 36 and is directed back to the pump, and a second (closed) position at which the output flow from the pump is directed to the hydraulic motors in the manner described above. In the preferred embodiment, the neutral valve 32 consists of two valves—a solenoid operated valve 70 and a pilot actuated valve 72. A neutral switch 74 (in the form of a dimmer switch) is provided for controlling the application of electrical power to the solenoid. As can be seen in FIG. 2, the neutral switch 74 may be mounted on the floor of the passenger area 12. Pilot feed lines 76, 78 are connected to pilot valve through the solenoid operated valve. The pilot lines 76, 78 are connected to receive hydraulic fluid from the pump through check valves 80, 82. When the neutral switch 74 is open, the solenoid valve 70 is biased to a first position (as shown in FIG. 3) which blocks the flow of fluid to the pilot actuated valve 72. In this position, the pilot feed lines 76, 78 are vented to a drain reservoir 84, and the pilot actuated valve 72 is biased to its open position (as shown). When pilot valve 72 is in its open position, fluid from the pump 28 bypasses the motors 36. When the neutral switch is closed, voltage from the battery 86 is applied to the solenoid valve 70 biasing the valve to a second position at which the pilot feed lines 76, 78 are connected to the valve 72. When the solenoid valve 70 is in its second position and fluid is being output from the pump 28, the check valve 80 or 82 on the feed side of the pump is biased open by the pressurized fluid output from the pump. Fluid flows through the pilot line 76 or 78, through the solenoid valve 70 and is applied to the pilot valve 72 to move it to its closed position. When the pilot valve 72 moves to its closed position, the fluid being output from the pump 28 is directed to the rear wheel motors 36, a, 36b in the manner described above. The neutral valve 32 allows the pump 28 to be disengaged from the motors 36 so the vehicle can be easily pushed by an individual.

Figure 4:
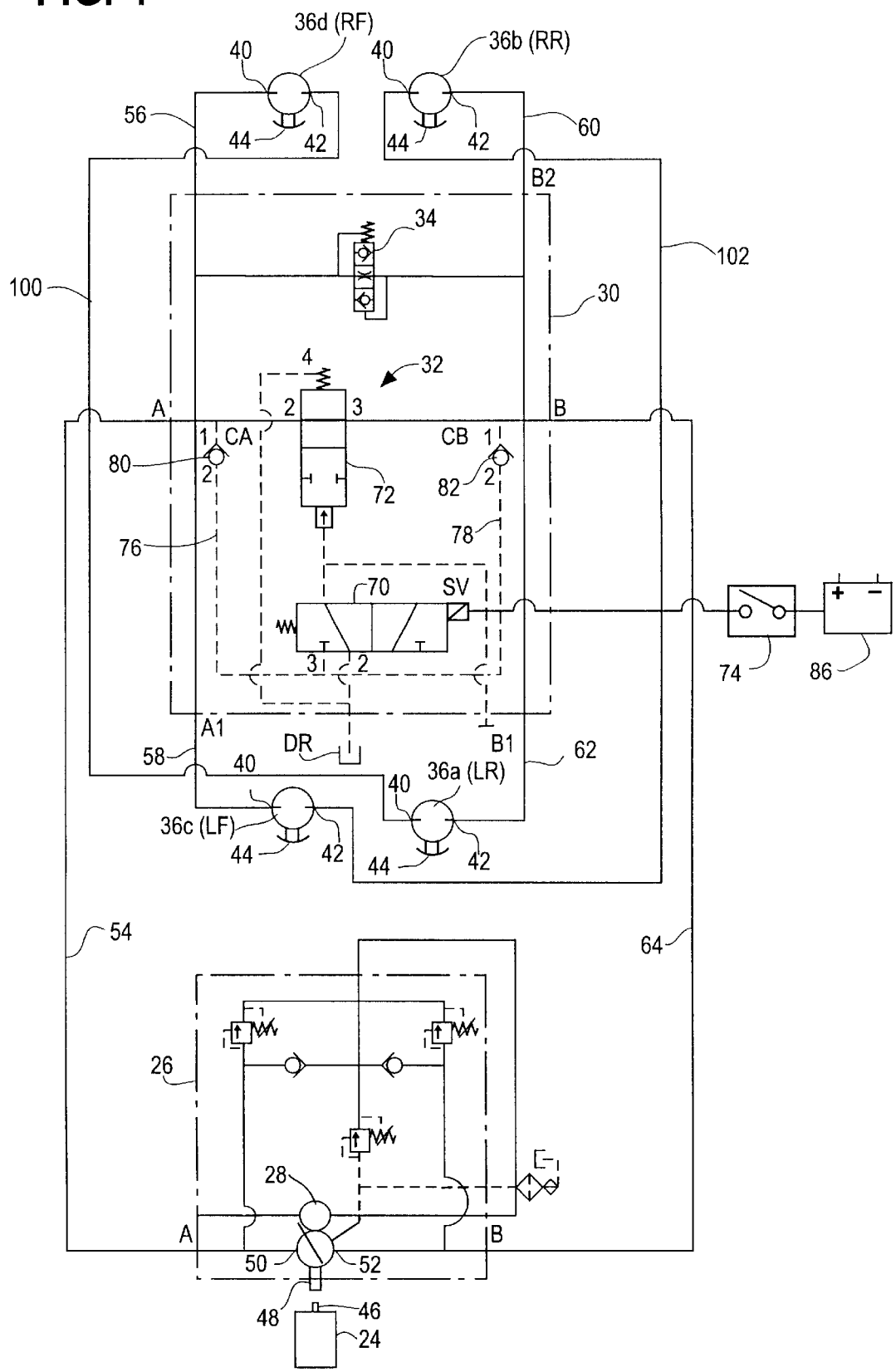
FIG. 4 is a schematic illustration of a four-wheel drive embodiment of hydrostatic drive according to the present invention.
Figure 5:
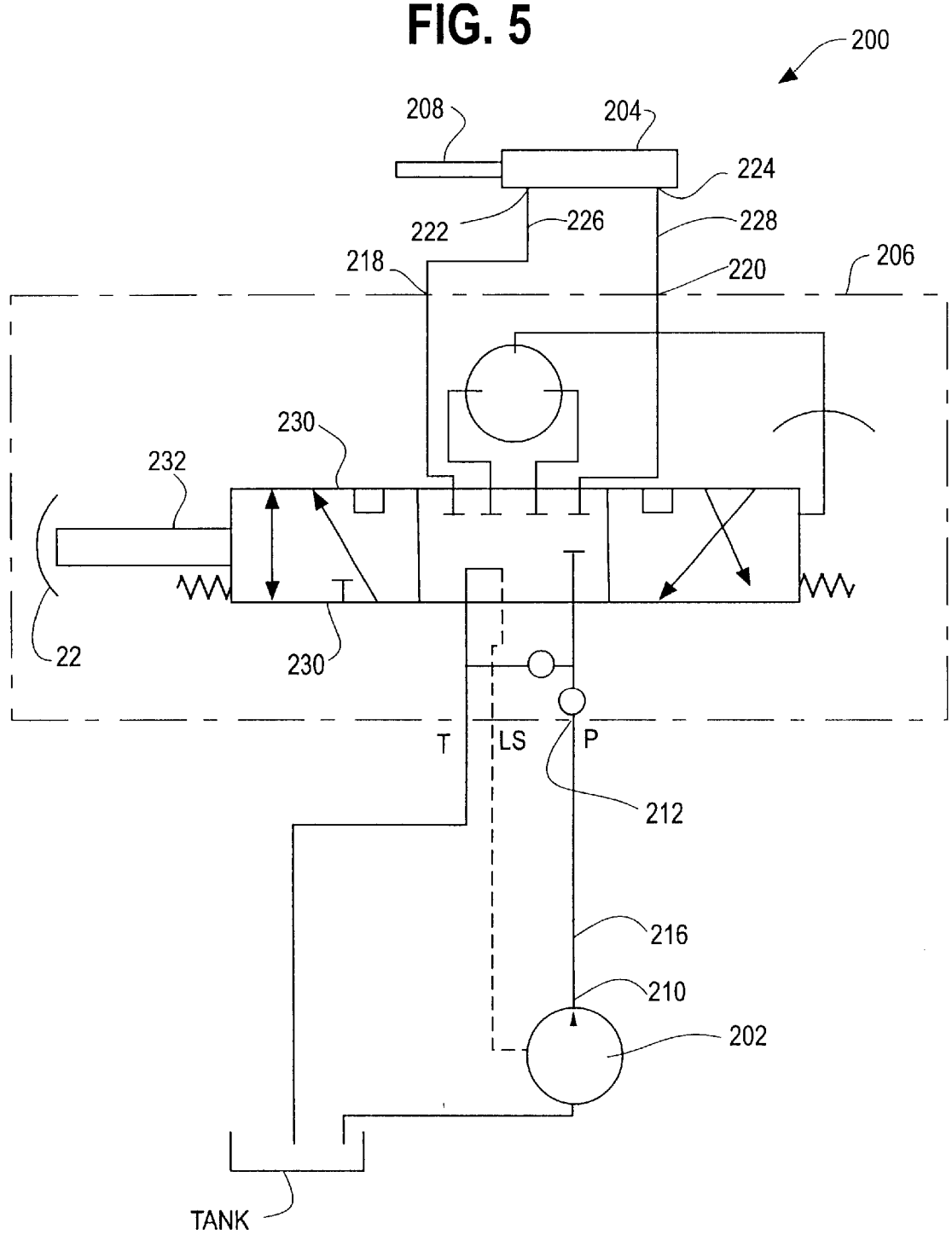
FIG. 5 is a schematic illustration of a hydrostatic steering system according to the present invention.

FIG. 4 illustrates a four-wheel drive hydrostatic drive according to the present invention. The same reference numerals have been used to identify like components in the two-wheel drive and four-wheel drive systems. In the four wheel drive system, the engine 28 may be a 25 hp Kohler v-twin engine and the pump 28 may be a Sundstrand 40 gpm hydrostatic pump. The four-wheel drive system differs from the two-wheel drive system in that it also includes a left front hydraulic motor 36c and a right front hydraulic motor 36d for imparting rotation of the front wheels in response to fluid flow through the motors. In this embodiment, fluid exiting the forward port 54 of the pump is directed to the control unit 30 via line 54. The fluid is then split evenly and directed to the first (forward) ports 50 of the front wheel motors 36c, 36d. The fluid turns the motors and exits their second or reverse port 52. The second or reverse port 52 of the right front motor 36d is interconnected with the first or forward port of the left rear motor 36a via line 100. The second or reverse port of the left front motor 36c is interconnected with the first or forward port 50 of the right rear motor 36b by a line 102. The reverse ports 52 of the rear motors 36a, 36b are in turn connected to the reverse port 52 of the hydraulic pump through the control unit 30. Hence, when the vehicle is operated in the forward direction the left rear motor 36a is driven by the fluid exiting from the right front motor 36d and the right rear motor 36b is driven by the fluid exiting the left front motor 36c. Conversely, when the vehicle is operated in the reverse direction, the right front motor 36d is driven by the fluid exiting the left rear motor 36a and the left front motor 36c is driven by the fluid exiting the right rear motor 36b. Plumbing the motors 36a–d in a cross pattern gives the vehicle better steering and traction by effectively providing it with a differential type system Referring now to FIG. 5, the hydrostatic steering system 200 will be briefly described. The steering system 200 includes a load sensing positive displacement pump 202 that is driven by the engine 24 and is adapted to apply pressurized fluid to a steering cylinder 204 through a steering orbitable valve 206. The steering cylinder 204 has an output shaft 208 that is connected to the steering linkage (not shown) for controlling the position of the front wheels 16c, 16d. The output 210 of the pump 202 is connected to an input port 212 on the steering control unit by a fluid line 216. The steering control unit has left and right output ports 218, 220 that are connected to left and right ports 222, 224 on the steering cylinder by respective fluid lines 226, 228. The steering orbitable valve 206 includes a flow control valve 230 which is connected to the steering wheel 22 by a shaft 232.

When the steering wheel is turned it directly actuates a manual valve in the orbital. The valve opens one side of the steering cylinder and a load sense "LS" line to pressure and the other side of the cylinder is open to tank. The "LS" line is connected to the pump which when supplied with a pressure differential, activates the pump. The flow is directed to the "P" port on the orbital and through the valve to a gear rotor. The gear rotor turns proportionally to the steering wheel and acts like a pump to direct fluid to the steering cylinder. The exiting flow from the cylinder is directed to tank.

What is claimed is:

1. A hydrostatic drive for a utility vehicle of the type having a prime mover and at least two-wheels, comprising:

two fixed displacement hydraulic motors, each motor having an forward port and a reverse port, and an output shaft connected to a different one of the wheels for imparting rotation thereon in response to fluid flow through the motor;

a variable displacement pump driven by the prime mover and being adapted to deliver a flow of hydraulic fluid, the variable displacement pump having a forward port interconnected with the forward ports of the motors for permitting fluid flow therebetween and a reverse port interconnected with the reverse ports of the motors for permitting fluid flow therebetween; and a flow control valve interconnected between the pump and the motors and being adapted to bypass fluid flow around the motors until the rate of flow from the pump reaches a predetermined level.

2. A hydrostatic drive as set forth in claim 1, further comprising an actuator connected to the variable displacement pump for controlling the direction and displacement of the pump, thereby controlling the direction and rate of fluid flow from the pump.

3. A hydrostatic drive as set forth in claim 1, further comprising a neutral valve interconnected between the pump and the motors, the neutral valve being movable between a first position at which fluid flow output from the pump bypasses the motors and is redirected to the pump and a second position at which the output flow from the pump is directed to the hydraulic motors; and an actuator for controllably moving the neutral valve between its first and second positions.

4. A hydrostatic drive for a utility vehicle of the type having a prime mover and at least two-wheels, comprising:

two fixed displacement hydraulic motors, each motor having an forward port and a reverse port, and an output shaft connected to a different one of the wheels for imparting rotation thereon in response to fluid flow through the motor;

a variable displacement pump driven by the prime mover and being adapted to deliver a flow of hydraulic fluid, the variable displacement pump having a forward port interconnected with the forward ports of the motors for permitting fluid flow therebetween and a reverse port interconnected with the reverse ports of the motors for permitting fluid flow therebetween;

a neutral valve interconnected between the pump and the motors, the neutral valve being movable between a first position at which fluid flow output from the pump bypasses the motors and is redirected to the pump and a second position at which the output flow from the pump is directed to the hydraulic motors; and an actuator for controllably moving the neutral valve between its first and second positions.

5. A hydrostatic drive as set froth in claim 4, further comprising an actuator connected to the variable displacement pump for controlling the direction and displacement of the pump, thereby controlling the direction and rate of fluid flow from the pump.

6. A hydrostatic drive as set forth in claim 4, further comprising a flow control valve interconnected between the pump and the motors and being adapted to bypass fluid flow around the motors until the rate of flow from the pump reaches a predetermined level.

7. A hydrostatic drive for a utility vehicle of the type having a prime mover, a left front wheel, a right front wheel, a left rear wheel and a right rear wheel, comprising:

a right front hydraulic motor and a left front hydraulic motor, each motor having an forward port and a reverse port, and an output shaft connected to a respective one of the front wheels for imparting rotation thereon in response to fluid flow through the motor;

a right rear hydraulic motor and a left rear hydraulic motor, each motor having an forward port and a reverse port, and an output shaft connected to a respective one of the wheels for imparting rotation thereon in response to fluid flow through the motor, wherein the reverse port of the right front motor is interconnected with the forward port of the left rear motor and the reverse port of the left front motor is interconnected with the forward port of the right rear motor;

a variable displacement pump driven by the prime mover and being adapted to deliver a flow of hydraulic fluid, the variable displacement pump having a forward port interconnected with the forward ports of the front motors for permitting fluid flow therebetween and a reverse port interconnected with the reverse ports of rear motors for permitting fluid flow therebetween.

8. A hydrostatic drive as set forth in claim 7, further comprising an actuator connected to the pump for controlling the direction and displacement of the pump, thereby controlling the direction and rate of fluid flow from the pump.

9. A hydrostatic drive as set forth in claim 7, further comprising a neutral valve interconnected between the pump and the motors, the neutral valve being movable between a first position at which fluid flow output from the pump bypasses the motors and is redirected to the pump and a second position at which the output flow from the pump is directed to the hydraulic motors; and an actuator for controllably moving the neutral valve between its first and second positions.

10. A hydrostatic drive as set forth in claim 7, further comprising a flow control valve interconnected between the pump and the motors and being adapted to bypass fluid flow around the motors until the rate of flow from the pump reaches a predetermined level.

* * * * *